US008432713B2

(12) United States Patent
Popescu et al.

(10) Patent No.: US 8,432,713 B2
(45) Date of Patent: Apr. 30, 2013

(54) SYSTEM AND METHOD FOR REDUCING AN INPUT CURRENT RIPPLE IN A BOOST CONVERTER

(75) Inventors: Lucian Popescu, Austin, TX (US); Padmanabh Gharpure, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 1002 days.

(21) Appl. No.: 12/131,236

(22) Filed: Jun. 2, 2008

(65) Prior Publication Data

US 2009/0295347 A1 Dec. 3, 2009

(51) Int. Cl.
*H02J 1/10* (2006.01)
*G05F 1/00* (2006.01)

(52) U.S. Cl.
USPC .............................................. 363/65; 323/285

(58) Field of Classification Search .................... 363/39, 363/44, 59, 78–82, 65; 323/207, 246, 275, 323/285, 266, 268
See application file for complete search history.

(56) References Cited

U.S. PATENT DOCUMENTS

| 5,565,761 | A | * | 10/1996 | Hwang | 323/222 |
| 6,091,233 | A | * | 7/2000 | Hwang et al. | 323/222 |
| 7,403,400 | B2 | * | 7/2008 | Stanley | 363/16 |
| 2005/0036337 | A1 | * | 2/2005 | Zhang et al. | 363/17 |
| 2006/0113975 | A1 | * | 6/2006 | Mednik et al. | 323/282 |
| 2007/0279955 | A1 | * | 12/2007 | Liu et al. | 363/125 |
| 2008/0055104 | A1 | * | 3/2008 | Masui et al. | 340/693.4 |

OTHER PUBLICATIONS

"Bridge PFC Converter with Split Boost Choke," Ales Leban et al., University of Ljubljana, Faculty of Electrical Engineering, IEEE 2003—Maribor. Slovenia, pp. 1102-1106.
"Converter and Inductor Design for Fast-Response Microprocessor Power Delivery," Gustavo J. Mehas et al., Thayer School of Engineering, Dartmouth College, 2 000 IEEE, pp. 1621-1626.

* cited by examiner

*Primary Examiner* — Adolf Berhane
*Assistant Examiner* — Jeffrey Gblende
(74) *Attorney, Agent, or Firm* — Larson Newman, LLP

(57) ABSTRACT

A device comprises a first power cell, a second power cell, a power factor correction module, a boost inductor switch circuit, and an output. The first and second power cells are configured to provide first and second currents in response to an input voltage. The power factor correction module is configured to continuously activate and deactivate the first and second power cells based on an input current level, on the input voltage, and on an output voltage. The boost inductor switch circuit is configured to disable the first power cell in response to the input current level being below a predetermined level. The output is configured to provide the output voltage based on the first and second currents when the input current level is above the predetermined level, and to provide the output voltage based on the second current when the input current level is below the predetermined level.

19 Claims, 4 Drawing Sheets

SYSTEM AND METHOD FOR REDUCING AN INPUT CURRENT RIPPLE IN A BOOST CONVERTER

FIELD OF THE DISCLOSURE

This disclosure generally relates to information handling systems, and more particularly relates to a boost converter with a reduced input current ripple.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Power factor (PF) and total harmonic distortion (THD) are two factors that affect the energy losses in a power supply of an information handling system. The PF is a ratio of the real power to the apparent power, and the lower the PF the more energy losses experienced. The THD is a ratio between the power of harmonic frequencies and the fundamental frequency of an alternating current of the power supply, and the power supply experiences more energy losses when the THD is high. Many power supplies use an active power factor correction (PFC) circuit to adjust the load of the power supply, increase the PF, and prevent energy losses caused by a low PF. However, many power supplies using active PFC circuits have poor PF/THD performance because of a large input current ripple at high input voltages and/or low output load conditions.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
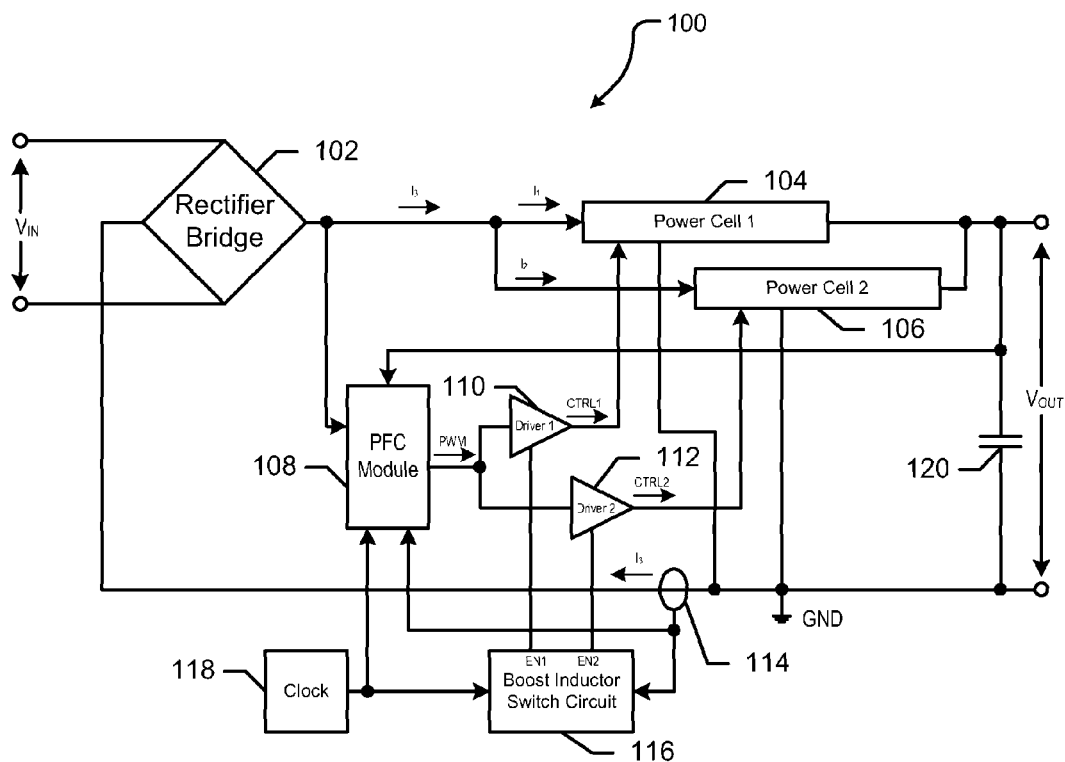
FIG. 1 is a block diagram of a boost converter.

FIG. 1 shows a block diagram of a boost converter 100 for an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The boost converter 100 comprises a rectifier bridge 102, power cells 104 and 106, and a power factor correction (PFC) module 108. The boost converter 100 also includes driver circuits 110 and 112, a current sensor 114, a boost inductor switch circuit 116, a clock 118, and an output capacitor 120. The rectifier bridge 102 has a first terminal connected to a first voltage reference, a second terminal, a third terminal connected to a second voltage reference, and a fourth terminal connected to a third voltage reference, labeled GND. The power cell 104 has a first terminal connected to the second terminal of the rectifier bridge 102, a second terminal, a third terminal connected to the third voltage reference, and a fourth terminal. The power cell 106 has a first terminal connected to the second terminal of the rectifier bridge 102, a second terminal, a third terminal connected to the third voltage reference, and a fourth terminal connected to the fourth terminal of the power cell 104.

The PFC module 108 has a first terminal connected to the second terminal of the rectifier bridge 102, and second, third, fourth and fifth terminals. The driver circuit 110 has a first terminal connected to the third terminal of the PFC module 108, a second terminal, and a third terminal connected to the second terminal of the power cell 104. The driver circuit 112 has a first terminal connected to the third terminal of the PFC module 108, a second terminal, and a third terminal connected to the second terminal of the power cell 106. The current sensor 114 has a first terminal connected to the fourth terminal of PFC module 108, and a second terminal. The boost inductor switch circuit 116 has a first terminal connected to the second terminal of the current sensor 114, a second terminal connected to the second terminal of the driver circuit 112, a third terminal connected to the second terminal of the driver circuit 110, and a fourth terminal. The clock 118 has an output terminal connected to the fifth terminal of the PFC module 108 and the fourth terminal of the boost inductor switch circuit 116. The output capacitor 120 has a first terminal connected to the second terminal of the power cell 104 and to the second terminal of the PFC module 108, and a second terminal connected to the third voltage reference.

The rectifier bridge 102 rectifies an alternating current (AC) input voltage, labeled $V_{IN}$, received across the first and third terminals. The power cell 104 is configured to be either enabled or disabled depending on an input current level of the boost converter 100. When enabled, the power cell 104 generates a current $I_1$ based on the rectified input voltage and on a first control signal CTRL1. When disabled, the power cell 104 does not generate the current $I_1$. In an embodiment, the power cell 104 is configured to be enabled when the input current level is above a predetermined level and disabled when the input current level is below the predetermined level.

The power cell 106 is configured to be either enabled or disabled depending on the input current level of the boost converter 100. When enabled, the power cell 106 generates a current $I_2$ based on the rectified input voltage and on a second control signal CTRL2. When disabled the power cell 106 does not generate the current $I_2$. In an embodiment, the power cell 106 is configured to be enabled at all input current levels. In another embodiment, the power cell 106 is configured to be enabled when the input current level is below the predetermined level, and disabled when the input current level is above the predetermined level.

The power cells 104 and 106 have different dynamic impedances such that during a period of high input currents, most of the input current is supplied to the power cell 104. The power cell 104 is designed to handle a higher power and a higher current level, while the power cell 106 is designed to handle a lower power and a lower current level. Also, the inductance value of the power cell 106 is significantly higher than the inductance value of the power cell 104.

The PFC module 108 provides a pulse width modulated (PWM) signal based on a clock signal, the rectified input voltage, an input current level, and an output voltage, labeled $V_{OUT}$. Based on variations in the rectified input voltage, the output voltage, and the input current, the PFC module 108 varies a duty cycle of the PWM signal so that an output voltage is regulated to a substantially constant direct current (DC) voltage.

The driver circuit 110 is configured to be either enabled or disabled depending on the input current level of the boost converter 100. When enabled the driver circuit 110 generates the control signal CTRL1. When disabled the driver circuit 110 does not generate the first control signal CTRL1. In an embodiment, the driver circuit 110 is configured to be enabled when the input current level is above a predetermined level and disabled when the input current level is below the predetermined level.

The driver circuit 112 is configured to be either enabled or disabled depending on the input current level of the boost converter 100. When enabled the driver circuit 112 generates the second control signal CTRL2. When disabled the driver circuit 112 does not generate the second control signal CTRL2. In an embodiment, the driver circuit 112 is configured to be enabled at all input current levels. In another embodiment, the driver circuit 112 is configured to be enabled when the input current level is below the predetermined level, and disabled when the input current level is above the predetermined level.

The current sensor 114 measures an input current level to determine whether the boost converter 100 is under a high current load or a light current load. The boost inductor switch circuit 116 is configured to output an enable signal and/or a disable signal over the output terminals EN1 and EN2 based on the input current level. In an embodiment, if the input current level is below the predetermined level, the boost inductor switch circuit 116 outputs the disable signal over output terminal EN1 and outputs the enable signal over output terminal EN2. If the input current level is above the predetermined level, the boost inductor switch circuit 116 outputs the enable signal over both output terminals EN1 and EN2. In another embodiment, if the input current level is above the predetermined level, the boost inductor switch circuit 116 outputs the enable signal over the output terminal EN1 and outputs the disable signal over the output terminal EN2.

During operation, the rectified input voltage is applied to the power cells 104 and 106, and to the PFC module 108. The current sensor 114 continuously monitors the input current level, and transmits the input current level to the PFC module 108 and to the boost inductor switch circuit 116. Based on the input current level, the boost inductor switch circuit 116 either enables or disables the driver circuits 110 and 112. Enabling and disabling the driver circuit 110 also enables and disables the power cell 104 because if the driver circuit is disabled, the power cell is not provided with the first control signal CTRL1, and thus the power cell is continuously off. Similarly, enabling and disabling the driver circuit 112 also enables and disables the power cell 106 because if the driver circuit is disabled, the power cell is not provided with the second control signal CTRL2, and thus the power cell is continuously off. The clock signal from the clock 118 synchronizes the PFC module 108 and the boost inductor switch circuit 116 such that the enable and disable signals are sent to the driver circuits 110 and 112 at the beginning of a cycle of the PWM signal from the PFC module.

When the input current level is above the predetermined level, the boost inductor switch circuit 116 transmits the enable signal to both of the driver circuits 110 and 112. The driver circuits 110 and 112 amplify the PWM signal and transmit the amplified PWM signals to the power cells 104 and 106 as the first and second control signals CTRL1 and CTRL2. The power cells 104 and 106 are continuously activated and deactivated in response to the duty cycle of the first and second control signals CTRL1 and CTRL2. The power cell 104 generates the first current $I_1$ and the power cell 106 generates the second current $I_2$ in response to the rectified input voltage and the first and second control signals CTRL1 and CTRL2. The first and second currents $I_1$ and $I_2$ are combined together and provided as the input current $I_3$.

When the input current level is below the predetermined level, the boost inductor switch circuit 116 transmits the disable signal to the driver circuit 110 and transmits the enable signal to the driver circuit 112. Thus, the power cell 104 is also disabled and does not provide the first current $I_1$. The driver circuit 112 amplifies the PWM signal and transmits the amplified PWM signal to the power cell 106 as the second control signal CTRL2. The power cell 106 is continuously activated and deactivated in response to the duty cycle of the second control signal CTRL2. The power cell 106 generates the second current $I_2$ in response to the rectified input voltage and the second control signal CTRL2. During periods of low input currents, the higher inductance value of the power cell 106 minimizes the input current ripple of the boost inductor 100 so that the PF increases and the energy losses decrease.

Figure 2:
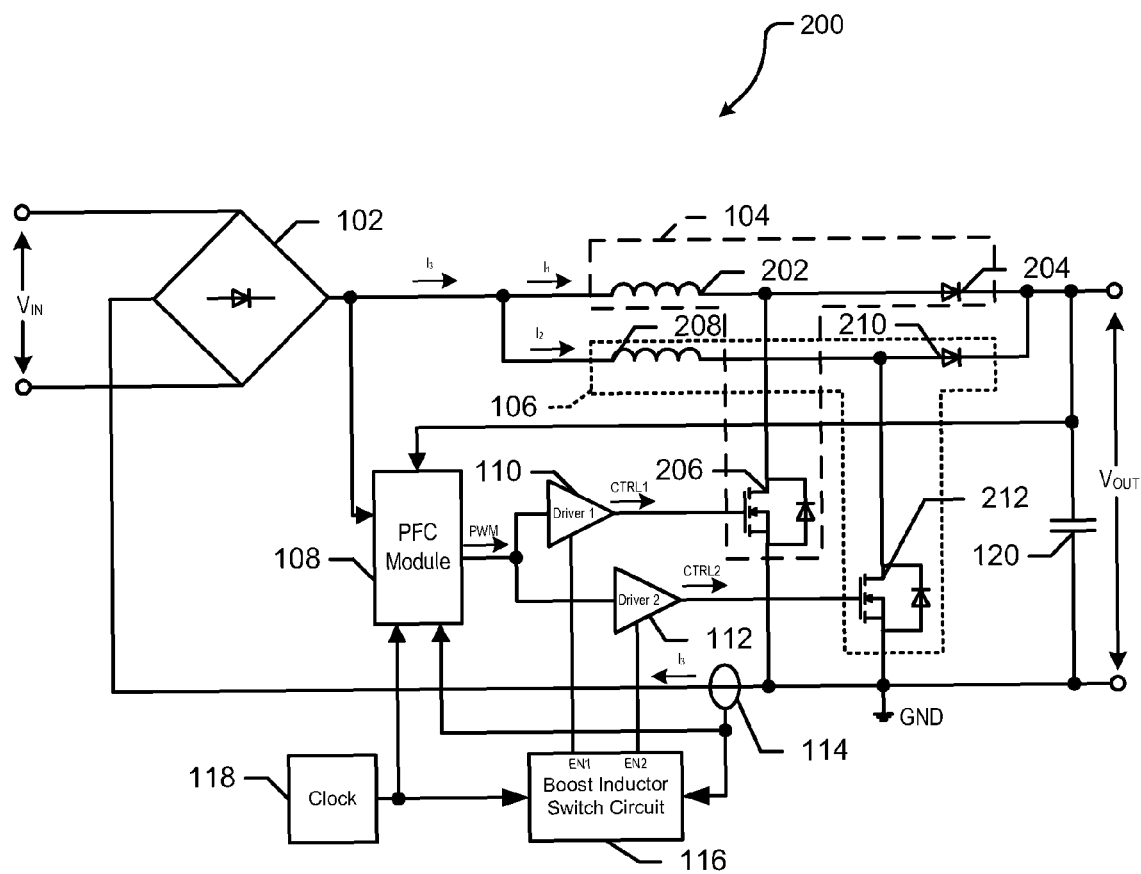
FIG. 2 is a schematic diagram of the boost converter of FIG. 1.

FIG. 2 shows a schematic diagram of the boost converter 100 including the power cell 104 having an inductor 202, a diode 204, and a transistor 206, and the power cell 106 having an inductor 208, a diode 210, and a transistor 212. The inductor 202 has a first terminal connected to the second terminal of the rectifier bridge 102, and a second terminal. The diode 204 has a first terminal connected to the second terminal of the inductor 202, and a second terminal. The transistor 206 has a first current electrode connected to the second terminal of the inductor 202, a second current electrode connected to the third voltage reference, and a control electrode connected to the third terminal of the driver circuit 110. The inductor 208 has a first terminal connected to the second terminal of the rectifier bridge 102, and a second terminal. The diode 210 has a first terminal connected to the second terminal of the inductor 208, and a second terminal connected to the second terminal of the diode 204. The transistor 212 has a first current electrode connected to the second terminal of the inductor 208, a second current electrode connected to the third voltage reference, and a control electrode connected to the third terminal of the driver circuit 112.

The inductor 202, the diode 204, and the transistor 206 of the power cell 104 are placed in a configuration to create an individual boost converter. When the PWM signal from the driver circuit 110 activates the transistor 206, the first current of the inductor 202 is provided to the transistor and not to the diode 204. Alternatively, when the PWM signal deactivates the transistor 206, the first current is provided to the diode 204. Additionally, the inductor 208, the diode 210, and the transistor 212 of the power cell 106 are placed in a configuration to create a second boost converter. Similarly, as the PWM signal from the driver circuit 112 activates the transistor 212, the second current from the inductor 208 is provided to transistor and not to the diode 210. Alternatively, when the PWM signal deactivates the transistor 212 the second current is provided to the diode 210. The same PWM signal is provided to both of the driver circuits 110 and 112 and thus to both of the power cells 104 and 106. Thus, regardless of the input current level, the output voltage $V_{OUT}$ is regulated to a substantially constant direct current voltage in response to the duty cycle of the PWM signal from the PFC module 108.

If the input current level is above the predetermined level, the boost inductor switch circuit 116 transmits the enable signal to the driver circuits 110 and 112. The driver circuits 110 and 112 amplify the PWM signal from the PFC module 108 and provide the amplified PWM signals, as the first and second control signals CTRL1 and CTRL2, to the transistors 206 and 212. Because the power cell 104 is designed to handle high input currents, most of the input current flows through the inductor 202 and the diode 204. Based on the rectified input voltage and the duty cycle of the first control signal CTRL1, the first current $I_1$ is provided from the inductor 202 to an output load. Additionally, the inductor 208 and the diode 210 receive a portion of the input current and as a result the second current $I_2$, significantly smaller than the first current $I_1$, is provided from the inductor 208 to the output load in response to the rectified input voltage and the duty cycle of the second control signal CTRL2. The input current $I_3$ is the sum of the first current $I_1$ and the second current $I_2$ flowing through the two boost inductors 202 and 208. In one embodiment, if the input current level is above the predetermined level, the boost inductor switch circuit 116 can disable the driver circuit 112 and the power cell 106 so that all of the input current is applied to the power cell 104.

When the current sensor 114 measures that the input current level is below the predetermined value, the boost inductor switch circuit 116 sends the disable signal to the driver circuit 110. The disable signal disables the driver circuit 110, and thus the power cell 104, because the driver circuit 110 does not provide the first control signal CTRL1 to the transistor 206. Thus, only the transistor 212 is activated and deactivated in response to the PWM signal. Based on the rectified input voltage and the second control signal CTRL2 from the driver circuit 112, the inductor 208 and the diode 210 provide the second current $I_2$ to the output load. The inductor 208 has a higher inductance value than the inductor 202. The higher inductance value reduces the input current ripple in the boost converter 100, thereby raising the PF and lowering energy losses.

Figure 3:
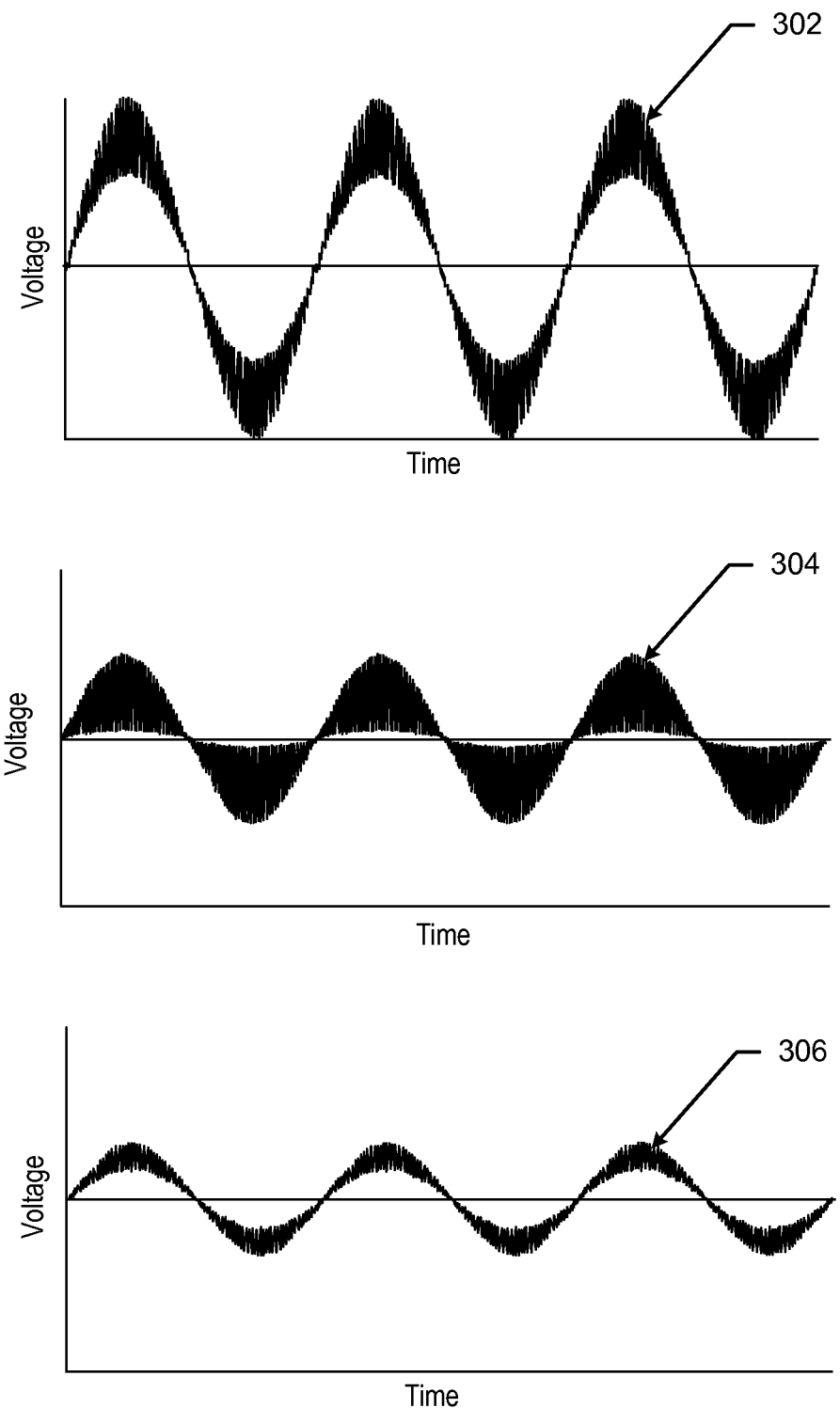
FIG. 3 is a plurality of waveforms associated with the boost converter of FIG. 1.

FIG. 3 shows a plurality of waveforms 302, 304, and 306 associated with the boost converter 100. The waveform 302 shows the input current during a period of full power in the boost converter 100. The waveform 304 shows the input current having a high amount of ripple during a period of low input current in the boost converter 100 when both the power cells 104 and 106 are enabled. The waveform 306 shows the input current has a low amount of ripple during the period of low input current in the boost converter 100 when only the power cell 106 is enabled.

Figure 4:
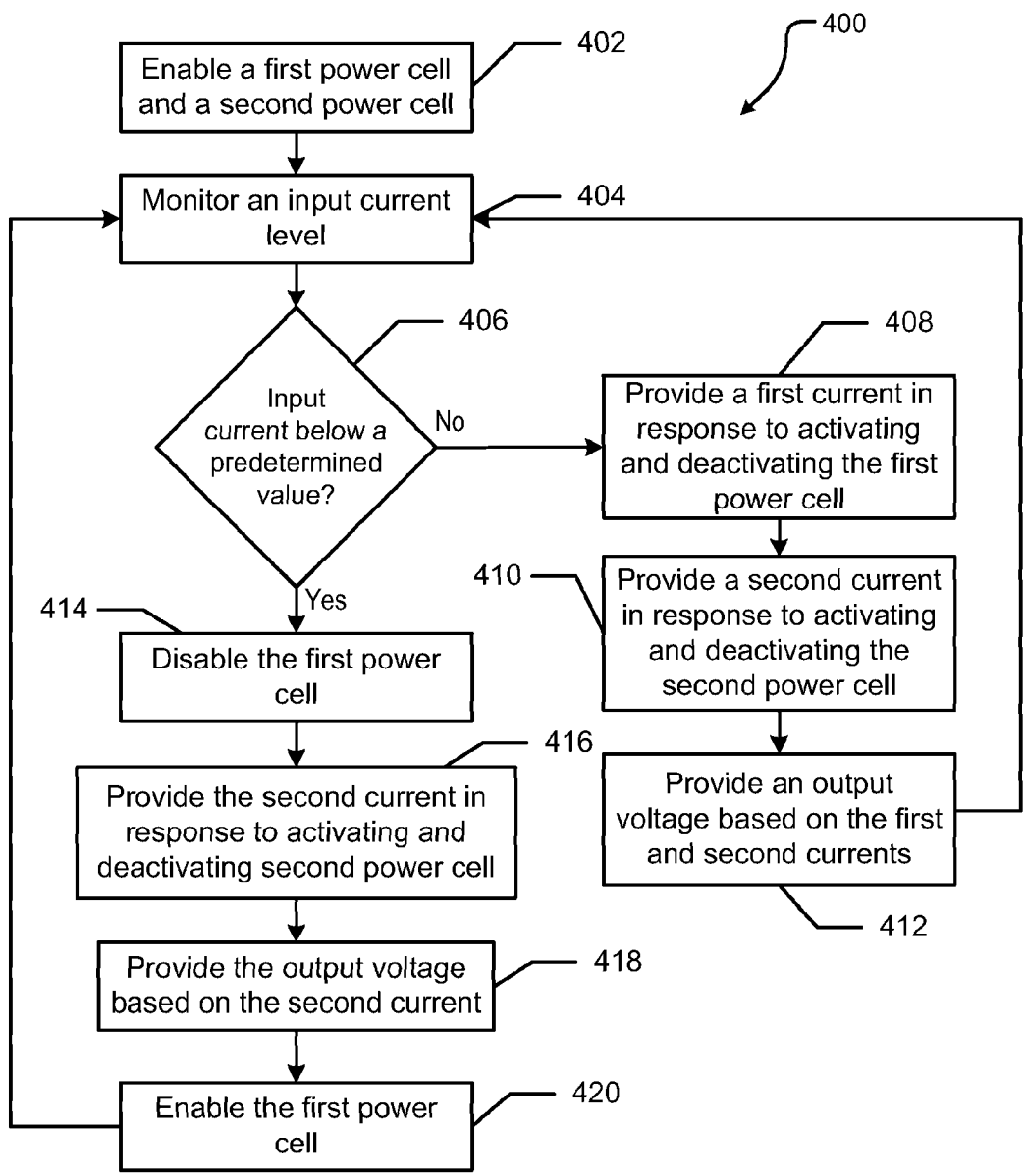
FIG. 4 is a block diagram of a method for minimizing an input current ripple in the boost converter of FIG. 1.

The boost converter 100 can be used to minimize the input current ripple of a power supply of the information handling system. FIG. 4 shows a block diagram of a method 400 for minimizing the input current ripple in the boost converter 100. At block 402, a first power cell and a second power cell are enabled. An input current level is monitored at block 404. At block 406, a determination is made whether the input current is below a predetermined value. If the input current level is not below the predetermined value, then a first current is provided to an output in response to activating and deactivating the first power cell at block 408. At block 410, a second current is provided to the output in response to activating and deactivating the second power cell. An output voltage is provided by the boost converter based on the first current and the second current at block 412 and the flow diagram continues as stated above at block 404.

If the input current is below the predetermined value, then first the power cell is disabled at block 414. At block 416, the second current is provided in response to activating and deactivating the second power cell. An output voltage is provided by the boost converter based on the second current at block 418. At block 420, the first power cell is enabled and the flow diagram continues as stated above at block 404.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A device comprising:
   a first power cell configured to provide a first current in response to an input voltage;
   a second power cell configured to provide a second current in response to the input voltage;
   a power factor correction module coupled to the first power cell and to the second power cell, the power factor correction module configured to output a first signal to continuously activate and deactivate the first power cell and the second power cell based on an input current level, on the input voltage, and on an output voltage;

a boost inductor switch circuit coupled to the first power cell and to the second power cell, the boost inductor switch circuit configured to output a second signal to enable the first power cell and a third signal to enable the second power cell when the input current level is above a predetermined level, and to disable the first power cell in response to the input current level being below the predetermined level;

a clock configured to provide a clock signal to the power factor correction module and the boost inductor switch circuit to synchronize the power factor correction module and the boost inductor switch circuit, wherein the boost inductor switch circuit sends the second signal and the third signal at a beginning of a cycle of the first signal when the boost inductor switch circuit is synchronized with the power factor correction module; and an output coupled to the first power cell and to the second power cell, the output configured to provide the output voltage based on the first current and on the second current when the input current level is above the predetermined level, and further configured to provide the output voltage based on the second current when the input current level is below the predetermined level.

2. The device of claim 1 further comprising:
a diode bridge coupled to the first power cell and to the second power cell, the diode bridge configured to rectify the input voltage from an alternating current voltage to a direct current voltage.

3. The device of claim 1 further comprising:
a first driver circuit coupled to the first power cell, the first driver circuit configured to transmit a pulse width modulated signal to the first power cell in response to receiving an enable signal.

4. The device of claim 3 further comprising:
a second driver circuit coupled to the second power cell, the second driver circuit configured to transmit a pulse width modulated signal to the second power cell in response to receiving an enable signal.

5. The device of claim 1 further comprising:
a current sensor configured to measure the input current level and to provide a measurement to the boost inductor switch circuit.

6. The device of claim 1 wherein the second power cell has a larger inductance value than the first power cell.

7. The device of claim 1 wherein the second power cell is further configured to minimize an input current ripple when the input current level is below the predetermined level.

8. The device of claim 1 wherein the first power cell comprises:
an inductor;
a diode having a first terminal connected to a terminal of the inductor, and a second terminal connected to the output; and
a transistor having a first current electrode connected to the terminal of the inductor, a second current electrode, and a control electrode coupled to an output terminal of the power factor correction module, the transistor configured to activate and to deactivate the first power cell in response to a pulse width modulated signal received.

9. The device of claim 1 wherein the second power cell further comprises:
an inductor;
a diode having a first terminal connected to a terminal of the inductor, and a second terminal connected to the output; and
a transistor having a first current electrode connected to the terminal of the inductor, a second current electrode, and a control electrode coupled to an output terminal of the power factor correction module, the transistor configured to activate and deactivate the second power cell in response to a pulse width modulated signal received.

10. A method comprising:
enabling a first power cell in response to a first signal output from a boost inductor switch circuit when an input current is above a predetermined level;
enabling a second power cell in response to a second, signal output from the boost inductor switch circuit when the input current is above the predetermined level;
continuously activating and deactivating the first power cell and the second power cell in response to a third signal output by a power factor correction module based on the input current, an input voltage, and on an output voltage, wherein the first and second signals are output from the boost inductor switch circuit at a beginning of a cycle of the third signal when the boost inductor switch circuit is synchronized with the power factor correction module,
outputting the output voltage based on a first current generated in response to activating and deactivating the first power cell and a second current generated in response to activating and deactivating the second power cell;
determining that the input current is below the predetermined level;
disabling the first power cell based on the input current being below the predetermined level; and
outputting the output voltage based only on the second current generated in response to continually activating and deactivating the second power cell when the input current is below the predetermined level.

11. The method of claim 10 wherein continually activating and deactivating the first power cell and the second power cell is based on a pulse width modulate signal.

12. The method of claim 10 further comprising:
minimizing an input current ripple based on disabling the first power cell when the input current is below the predetermined level.

13. The method of claim 10 wherein the second power cell has a larger inductance than the first power cell.

14. A method comprising:
determining an input current level;
if the input current is above a predetermined level, outputting, via a boost inductor switch circuit, a first signal to enable a first power cell and outputting, via the boost inductor switch circuit, a second signal to enable a second power cell;
outputting, via a power factor correction module, a third signal to continuously activate and deactivate the first power cell and the second power cell based on the input current level, au input voltage, and on an output voltage, wherein the first and second signals are output from the boost inductor switch circuit at a beginning of a cycle of the third signal when the boost inductor switch circuit is synchronized with the power factor correction module;
providing a first current from the first power cell, and providing a second current from the second power cell;
if the input current is below a predetermined level, disabling the first power cell;
providing only the second current from the second power cell in response to continually activating and deactivating the second power cell when the input current is below the predetermined level; and outputting the output voltage based on the first current and on the second current.

15. The method of claim 14 further comprising:
providing a pulse width modulated signal to the first power cell and the second power cell when the input current is above the predetermined level.

16. The method of claim 14 further comprising:
providing a pulse width modulated signal to the second power cell when the input current is below the predetermined level.

17. The method of claim 14 further comprising:
continually activating and deactivating the first power cell and the second power cell based on a pulse width modulate signal.

18. The method of claim 14 further comprising:
minimizing an input current ripple based on disabling the first power cell when the input current is below the predetermined level.

19. The method of claim 14 wherein the second power cell has a larger inductance than the first power cell.

* * * * *